US007231630B2

(12) United States Patent
Acott et al.

(10) Patent No.: US 7,231,630 B2
(45) Date of Patent: Jun. 12, 2007

(54) METHOD AND SYSTEM AUTOMATIC CONTROL OF GRAPHICAL COMPUTER APPLICATION APPEARANCE AND EXECUTION

(75) Inventors: Troy Steven Acott, Beaverton, OR (US); Joanna Mason, Portland, OR (US); Michael W. Wallace, Vancouver, WA (US); Larry Alan Westerman, Portland, OR (US)

(73) Assignee: Ensequence Inc., Portland, OR (US)

( * ) Notice: Subject to any disclaimer, the term of this patent is extended or adjusted under 35 U.S.C. 154(b) by 828 days.

(21) Appl. No.: 10/427,735

(22) Filed: Apr. 30, 2003

(65) Prior Publication Data

US 2004/0010794 A1   Jan. 15, 2004

Related U.S. Application Data

(60) Provisional application No. 60/395,653, filed on Jul. 12, 2002.

(51) Int. Cl.
*G06F 9/44* (2006.01)
*G06F 3/00* (2006.01)
(52) U.S. Cl. .................. 717/105; 719/318
(58) Field of Classification Search ............. None
See application file for complete search history.

(56) References Cited

U.S. PATENT DOCUMENTS

| | | | |
|---|---|---|---|
| 5,163,016 A * | 11/1992 | Har'El et al. .......... 716/5 |
| 5,386,464 A | 1/1995 | Pruitt | |
| 5,485,600 A | 1/1996 | Joseph et al. | |
| 5,509,116 A | 4/1996 | Hiraga et al. | |
| 5,537,528 A | 7/1996 | Takahashi et al. | |
| 5,561,457 A | 10/1996 | Cragun et al. | |
| 5,596,331 A * | 1/1997 | Bonaffini et al. .......... 342/455 |
| 5,604,907 A | 2/1997 | Conner et al. | |
| 5,680,617 A | 10/1997 | Gough et al. | |
| 5,724,472 A | 3/1998 | Abecassis | |
| 5,830,193 A * | 11/1998 | Higashikawa .............. 604/191 |

(Continued)

FOREIGN PATENT DOCUMENTS

DE         201 16 722         2/2002

(Continued)

OTHER PUBLICATIONS

Schuett, et al., A soft state protocol for accessing mulitmedia archieves, Jul. 1998, NOSSDAV, Dept of EECS, UC, Berkley, pp. 1-11.*

*Primary Examiner*—Tuan Dam
*Assistant Examiner*—Andre R Fowlkes
(74) *Attorney, Agent, or Firm*—Black Lowe & Graham, PLLC

(57) ABSTRACT

A method and system are provided for controlling a computer, data, or media system in response to state changes in the computer system. At least one state table having a first dimension and a second dimension is created. At least one programming element is listed along the first dimension and a plurality of states of the computer system are listed along the second dimension. At each intersection of the first dimension and the second dimension is a cell in which an operand is specified for the programming element at each state. For each state change of the computer system, each programming element listed along the first dimension is executed according to the operand listed for a current state.

90 Claims, 10 Drawing Sheets

U.S. PATENT DOCUMENTS

| | | |
|---|---|---|
| 5,870,727 A | 2/1999 | St. Jacques et al. |
| 5,883,670 A | 3/1999 | Sporer et al. |
| 5,903,886 A * | 5/1999 | Heimlich et al. ............. 706/50 |
| 6,088,028 A | 7/2000 | Gipalo |
| 6,182,206 B1 * | 1/2001 | Baxter ........................ 712/43 |
| 6,211,872 B1 | 4/2001 | Matsutsuka et al. |
| 6,223,347 B1 | 4/2001 | Watanabe et al. |
| 6,263,339 B1 | 7/2001 | Hirsch |
| 6,467,078 B1 * | 10/2002 | Matsuba et al. ............ 717/100 |
| 6,628,303 B1 | 9/2003 | Foreman et al. |

FOREIGN PATENT DOCUMENTS

| | | |
|---|---|---|
| EP | 0335638 | 3/1989 |
| EP | 0 335 638 | 10/1989 |
| WO | WO 01 45391 | 6/2001 |

* cited by examiner

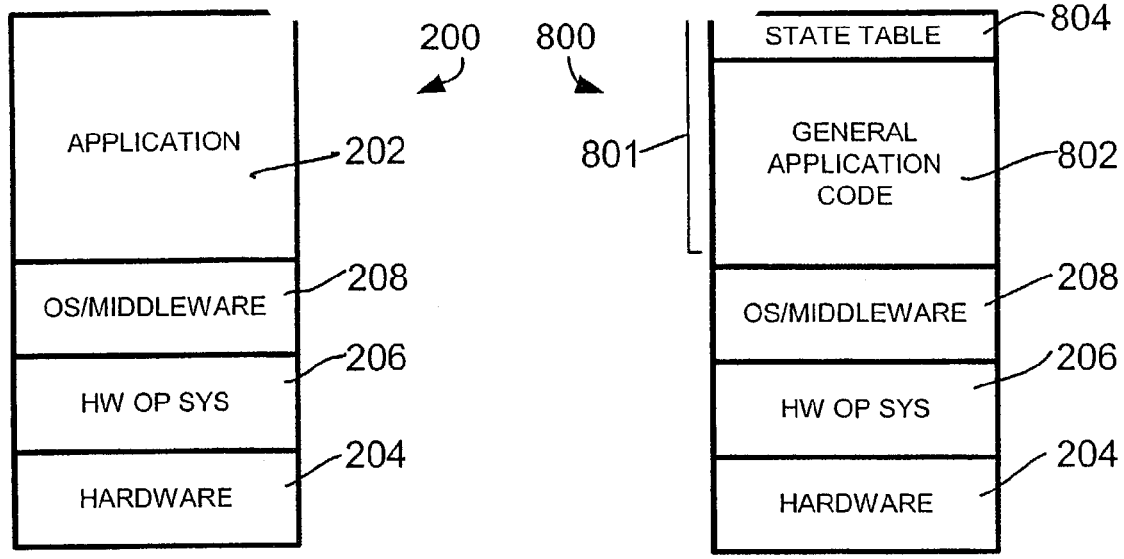
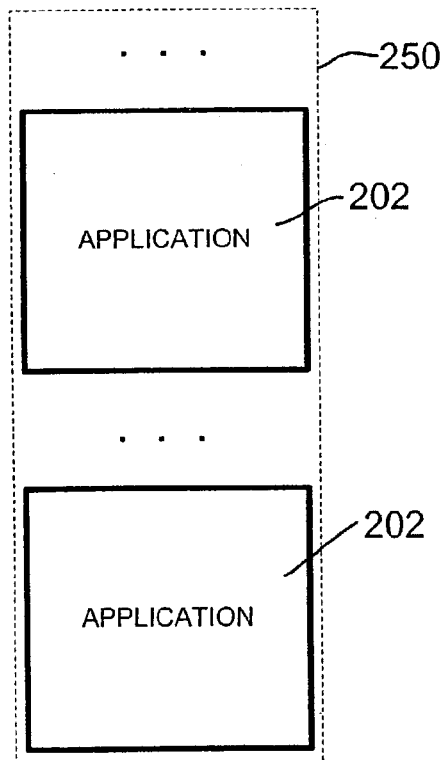
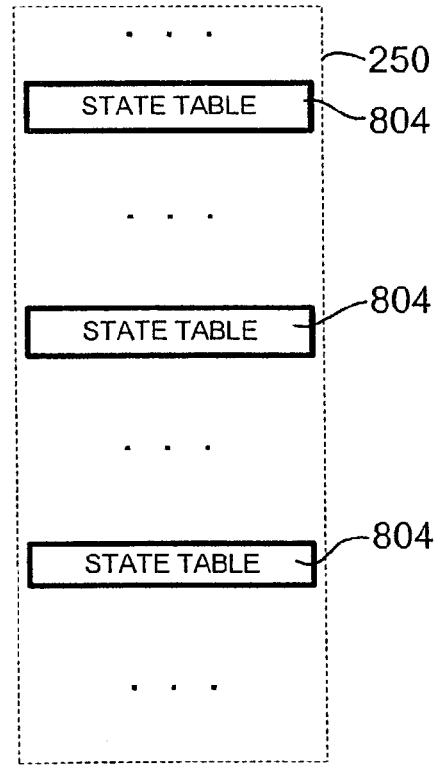
Fig. 2A (Prior Art)
Fig. 8A
Fig. 2B (Prior Art)
Fig. 8B

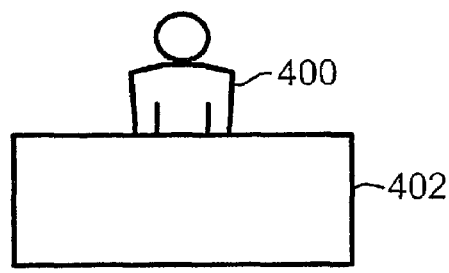
Fig. 4A (State 0)
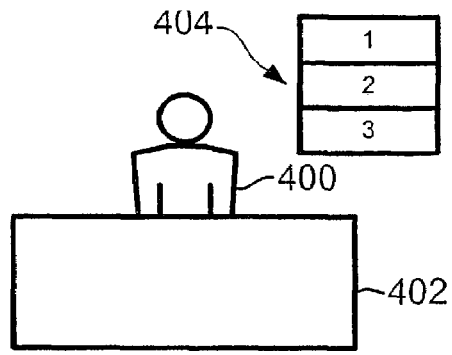
Fig. 4B (State 1)
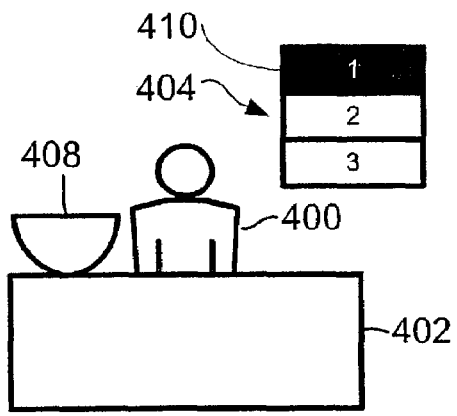
Fig. 4C (State 2)
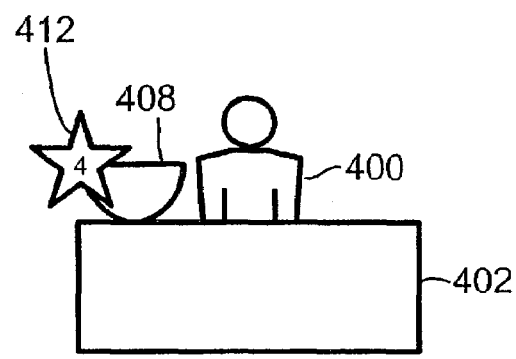
Fig. 4D (State 3)
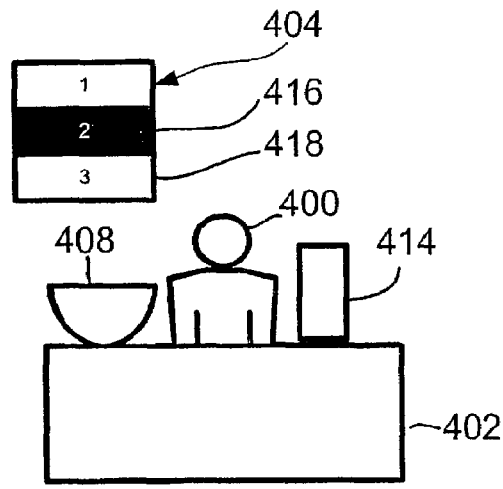
Fig. 4E (State 4)
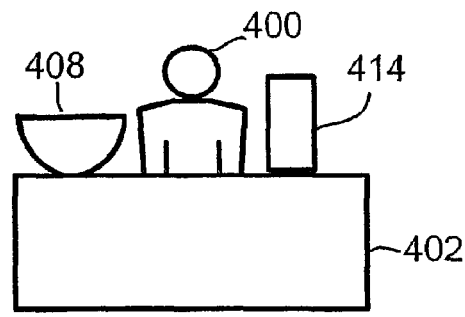
Fig. 4F (State 5)

| Operation | State 0 | State 1 | State 2 | State 3 | State 4 | State 5 |
|---|---|---|---|---|---|---|
| Store in Button1.Left | 800 | NO_CHANGE | NO_CHANGE | NO_CHANGE | 200 | NO_CHANGE |
| Store in Button1.Top | 700 | NO_CHANGE | NO_CHANGE | NO_CHANGE | NO_CHANGE | NO_CHANGE |
| Store in Button2.Left | 800 | NO_CHANGE | NO_CHANGE | NO_CHANGE | 200 | NO_CHANGE |
| Store in Button2.Top | 600 | NO_CHANGE | NO_CHANGE | NO_CHANGE | NO_CHANGE | NO_CHANGE |
| Store in Button3.Left | 800 | NO_CHANGE | NO_CHANGE | NO_CHANGE | 200 | NO_CHANGE |
| Store in Button3.Top | 500 | NO_CHANGE | NO_CHANGE | NO_CHANGE | NO_CHANGE | NO_CHANGE |
| Store in Button4.Left | 200 | NO_CHANGE | NO_CHANGE | NO_CHANGE | NO_CHANGE | NO_CHANGE |
| Store in Button4.Top | 500 | NO_CHANGE | NO_CHANGE | NO_CHANGE | NO_CHANGE | NO_CHANGE |
| Store in Button1.Visible | False | True | True | False | True | False |
| Store in Button2.Visible | False | True | True | False | True | False |
| Store in Button3.Visible | False | True | True | False | True | False |
| Store in Button4.Visible | False | False | False | True | False | False |
| Button1.Text | 1 | NO_CHANGE | 2 | NO_CHANGE | 1 | NO_CHANGE |
| Button1.Color | 2 | NO_CHANGE | 1 | NO_CHANGE | 2 | NO_CHANGE |
| Button2.Text | 1 | NO_CHANGE | NO_CHANGE | NO_CHANGE | 2 | NO_CHANGE |
| Button2.Color | 2 | NO_CHANGE | NO_CHANGE | NO_CHANGE | 1 | NO_CHANGE |
| Button3.Text | 1 | NO_CHANGE | NO_CHANGE | NO_CHANGE | NO_CHANGE | NO_CHANGE |
| Button3.Color | 2 | NO_CHANGE | NO_CHANGE | NO_CHANGE | NO_CHANGE | NO_CHANGE |
| Button4.Color | 3 | NO_CHANGE | NO_CHANGE | Func4 | NO_CHANGE | NO_CHANGE |
| Call given function | NO_CHANGE | NO_CHANGE | NO_CHANGE | Func4 | NO_CHANGE | NO_CHANGE |

Fig. 5

METHOD AND SYSTEM AUTOMATIC CONTROL OF GRAPHICAL COMPUTER APPLICATION APPEARANCE AND EXECUTION

PRIORITY CLAIM

This invention claims priority from U.S. Provisional Application No. 60/395,653, entitled "METHOD AND SYSTEM FOR AUTOMATIC CONTROL OF GRAPHICAL COMPUTER APPLICATION APPEARANCE AND EXECUTION," filed Jul. 12, 2002.

RELATED APPLICATIONS

This patent application is related to concurrently-filed patent applications entitled "METHOD AND SYSTEM FOR FLEXIBLE TIME-BASED CONTROL OF APPLICATION APPEARANCE AND BEHAVIOR," bearing Ser. No. 10/427,343 , "METHOD AND SYSTEM FOR PROVIDING FLEXIBLE TIME-BASED CONTROL OF APPLICATION APPEARANCE AND BEHAVIOR," bearing Ser. No. 10/427,255, and "METHOD AND SYSTEM FOR GENERATING FLEXIBLE TIME-BASED CONTROL OF APPLICATION APPEARANCE AND BEHAVIOR," bearing Ser. No. 10/427,357, all of which are incorporated by reference.

FIELD OF THE INVENTION

This invention relates generally to computer software applications and, more specifically, to programming and execution of graphical user interface programs.

BACKGROUND OF THE INVENTION

Many positive consequences have resulted from the continual improvements in the price performance of microcomputer technologies. For example, graphical user interface driven applications have displaced less user-friendly command driven applications. Also, microcomputers have proliferated from the desktop computer to the laptop computer, personal digital assistants, cellular telephones, set-top boxes for televisions, and myriad other devices.

On the other hand, the improvements in microcomputer technologies have also resulted in some issues. With improvements in microprocessor systems, data transfer to and from the microprocessor presents more of a concern in processing throughput. Similarly, with the proliferation of microcomputer devices, demand on both wired and wireless networking bandwidth is constantly increasing. At the same time, the luxury of fast microprocessors and inexpensive large capacity memory systems has led to software engineers and programmers tending to generate less efficient code. The cost of the human capital to develop efficient code cannot be justified in the face of cheaper processing power that in many cases allows relatively inefficient code to run sufficiently quickly.

Within this context, there are challenges faced in creating an interactive computer application in today's environment. First, there is a conflict between the proliferation of computing devices on one hand and the tendency to create less efficient code because of the improved price performance of hardware. To take one example, a ubiquitous yet often overlooked home computer is the digital set-top box (STB) present in households receiving digital cable or digital satellite television signals. Most applications evident to the user are simple, such as changing channels; displaying a program guide; identifying the program; name; specifying the start time and run time of a program; and perhaps a short synopsis of the program. At the same time, the STB has to undertake many functions which may not be apparent to the user. For example, the STB has to coordinate which "channel" chosen by the user is represented by which data stream, and has to receive and decode the mass of video and audio data blocks which contain the program content.

Improved price performance of hardware has made the proliferation of these devices affordable and, therefore, practical. However, the computer hardware within the STB is very rudimentary by today's standards. A typical STB is operated by a relatively slow microprocessor, has very little random access memory, and little or no program storage. Because of this last reason, the STB frequently has to update the application code or data it stores, and cannot store large quantities of data at any time. Further, even though the STB necessarily has access to broadband data input, even if more memory were available to the STB, loading large quantities of non-video and non-audio data is not readily possible because the data stream is largely filled by video and audio data blocks for all the channels made available to the user through the cable or satellite feed.

Overcoming such concerns would allow STBs to be more fully exploited and thereby enhance the television production and viewing experience. For example, the addition of graphical information in a television program conventionally is performed in show postproduction by an editor, and the information actually becomes embedded as part of the visual data transmitted by the program. This same information could be received as data and superimposed on the video images of the telecast. Moreover, STBs could be used to allow user interaction with a program, such as by playing along with game shows or purchasing items displayed during a telecast. Currently, while it is possible to offer a telephone number, a web address, a vendor name, and similar information to allow an interested viewer to purchase an item indirectly, there are not opportunities to interactively purchase via the STB.

Second, when creating an application to be interactively engaged by a user, the designer of the application considers the application's behaviors in response to the user's actions as well as other changing circumstances. These circumstances may include the passage of time, direct user interaction with the input interface of the computer, or alterations in internal or external control signals. The challenge of creating a computer application to encapsulate the desired behavior is to accurately define these behaviors, then incorporate the behavior into a series of algorithmic statements. Typically, a designer or implementer of an interactive application will create explicit algorithmic statements in the coding language which implement the desired behavior. Control statement constructs, such as IF-THEN-ELSE or DO-WHILE logical constructions, are used to test for various conditions, the result of which can initiate simple operations. The sequential testing of these multiple control statements and the combination of the simple operations keyed thereby can then be combined into more complex behavior to create the appearance of a sophisticated application.

These first and second challenges may, however, conflict with each other. Capturing desired application behavior in a series of testing statements can require extensive code. Further, in the STB environment, both storing and securing the bandwidth to obtain necessary conditional coding sections present problems.

In order to try to effectuate desired conditional programming behavior in a compact data size, some program logic can be converted into equivalent data content. The data content, with the desired behavioral aspects of the application embedded therein, can interact with the control logic to execute the desired behavior without downloading all new application code for each desired set of functions.

One example of how this is done is a data-driven control mechanism such as that described by Watanabe et al. in U.S. Pat. No. 6,223,347, "DATA DISPLAY CONTROL APPARATUS" ("Watanabe"). Watanabe discloses a system which uses pre-encoded data to specify changing the appearance of an application according to predetermined behaviors which are instituted by the receipt of user actions, or by the passage of time. For each of a set of display screens, modifications of properties of elements of the screen can be made by invoking a "handler." A handler is a small byte code sequence which accomplishes some change in the system properties, such as making a button visible or invisible, or displaying an alternative screen. FIG. 1, which represents FIG. 6 from Watanabe, shows a pre-encoded data element 100 as disclosed by Watanabe for controlling the appearance of a single display screen.

Viewed practically, Watanabe's data element 100 is a code fragment which dictates the response of the application in response to changing conditions. The data element 100 manifests an IF-THEN construct keyed by whether a user selects a VIDEO button 106 or a STEREO button 110. Moreover, the data element only encapsulates one aspect of the behavior for one single, conditional choice. To create a complex behavioral response to the user input, a series of stacked data elements like data element 100 would have to be created.

In addition, the system of Watanabe has a drawback which is shared by other similar systems such as web browsers. The Watanabe solution employs discrete code fragments which are executed in response to particular behavior, in just the same way that a web page is encoded to activate a link when the user clicks on a button or block to which the link is associated. As such, just as in a web browser the navigation available to the user is limited to the pre-defined URL links embedded in the source code for the page, under Watanabe the programming logic is fixed at design time to handlers pre-coded in the application. Also like a web browser, in which the transition to a new page represented by the link is automatic in response to the link being chosen, under Watanabe's system the behavior is responsive to the last conditional branch taken by the system in response to a user selection. Watanabe cannot take account of previous states from which the user selection was made or based on a combination of variables. The user's experience is based solely on the application's response to the last individual selection made by the user.

One alternative to the simple selection/pre-encoded direct response system of Watanabe is to create an executable application which implements behavior based on conditional testing of multiple application variables or inputs. However, an inefficiency inherent in constructing application behavior from conditional program logic is that each potential alternative condition must continually be tested for and operated upon. Some reuse of code is always possible, but generally the code has to be modified to manifest all the variables and the consequences of their values to handle each new special case of behavior. In other words, with reference to the example from Watanabe, the same byte code specified in the Bytecode_Part 150 would have to be incorporated into the conditional program logic, but would be surrounded by code to test for which subset of byte code should be executed. This conditional code must be executed before the 'operational' effect can be realized from the core byte code, which leads to inefficiency.

Adding or updating code also presents concerns from the standpoint of program storage, loading time, and data communications bandwidth. FIG. 2A shows a computer system 200 and a typical application 202 residing within the system 200. The system 200 presents a hardware layer 204 which is controlled by a low-level hardware operating system 206, such as the Basic Input/Output System (BIOS) residing on a typical personal computer. An operating system or middleware 208 typically runs above the hardware operating system 206. Ultimately, the application 202 then resides on top of the operating system. If the application 202 has to be swapped out, updated, or otherwise changed, entire modules of code, or perhaps the entire application are changed. As shown in FIG. 2B, loading a new, different, revised, or updated application 202 would consume appreciable bandwidth of a data path 250. Moreover, if the pathway is a relatively slow network line rather than a relatively fast local bus, the time and bandwidth required to communicate the application would be appreciable for one such transmission. The aggregate bandwidth consumed for a number of changes or updates can becomes a tremendous bandwidth concern.

Thus, there is an unmet need in the art for controlling appearance and execution of computer applications without having to create, load, and store code instruction segments to control desired computer behavior in response to changing variables and conditions in which the application operates.

SUMMARY OF THE INVENTION

Embodiments of the present invention provide a method, a computer readable medium, a data system for controlling operation of a computer system, or an interactive media control system for efficient control of the operation of a computer, data, or media control system. Desired behaviors in response to changes in state of a system using the present invention are coded in data form, and the data is processed in response to state changes. Accordingly, the present invention advantageously allows for application behaviors to be coded without writing new code. Moreover, behaviorial functions of the system can be controlled or changed by changing the data without changing or loading an entire application. The data suitably takes the form of a state table which governs the operation of programming elements, such as function calls or values being set, in response to state changes without having to create and load conditional code for monitoring every behavior.

More specifically, embodiments of the present invention provide a method and system for controlling computer system operation in response to state changes in the computer system. At least one state table is created, and the state table has a first dimension and a second dimension. At least one programming element is listed along the first dimension and a plurality of states of the computer system are listed along the second dimension. At each intersection of the first dimension and the second dimension is a cell in which an operand is specified for the programming element at each state. For each state change of the computer system, each programming element listed along the first dimension is executed according to the operand listed for a current state.

In accordance with further aspects of the invention, non-null operands are pushed onto a stack from which they are retrieved for processing. In one embodiment, the non-null operands suitably are pushed onto the stack by an execution model, and retrieved and processed by a byte-code interpreter. The programming elements may represent function calls, for which the function is specified as an operand, automatic function calls, or value setting functions to set a value for a program variable. The programming element also can be a code segment of its own, as the state table can be of variable or fixed length. Further, the state table can be subdivided into a state table structure, specifying the programming elements, and a state table file, specifying the operands such that the state table structure and state table file can be changed and loaded separately. Forms of transitions between states for programming elements can be specified with the operands, such as transition types, final states, or transition durations, or a default transition can be used.

BRIEF DESCRIPTION OF THE DRAWINGS

The preferred and alternative embodiments of the present invention are described in detail below with reference to the following drawings.

FIG. 2A is an operational hierarchy map of a computer system using a prior art application;

FIG. 2B is a graphical depiction of a data stream using a prior art application in which application code has to be loaded in response to operational run-time changes;

FIGS. 4A-4F are screens from an interactive computer program displayed to a user using an embodiment of the present invention;

FIG. 5 is a state table controlling the run-time operation of the interactive computer program displayed to the user in FIGS. 6A-6F;

FIG. 8A is operational hierarchy map of a computer system using an application making use of a state table according to an embodiment of the present invention;

FIG. 8B is a graphical depiction of a data stream using an application in which state table files according to an embodiment of the present invention are loaded in response to operational run-time changes;

DETAILED DESCRIPTION OF THE INVENTION

Embodiments of the present invention provide a method and system for controlling computer system operation in response to state changes in the computer system. At least one state table is created, and the state table has a first dimension and a second dimension. At least one programming element is listed along the first dimension and a plurality of states of the computer system are listed along the second dimension. At each intersection of the first dimension and the second dimension is a cell in which an operand is specified for the programming element at each state. For each state change of the computer system, each programming element listed along the first dimension is executed according to the operand listed for a current state.

Figure 1:
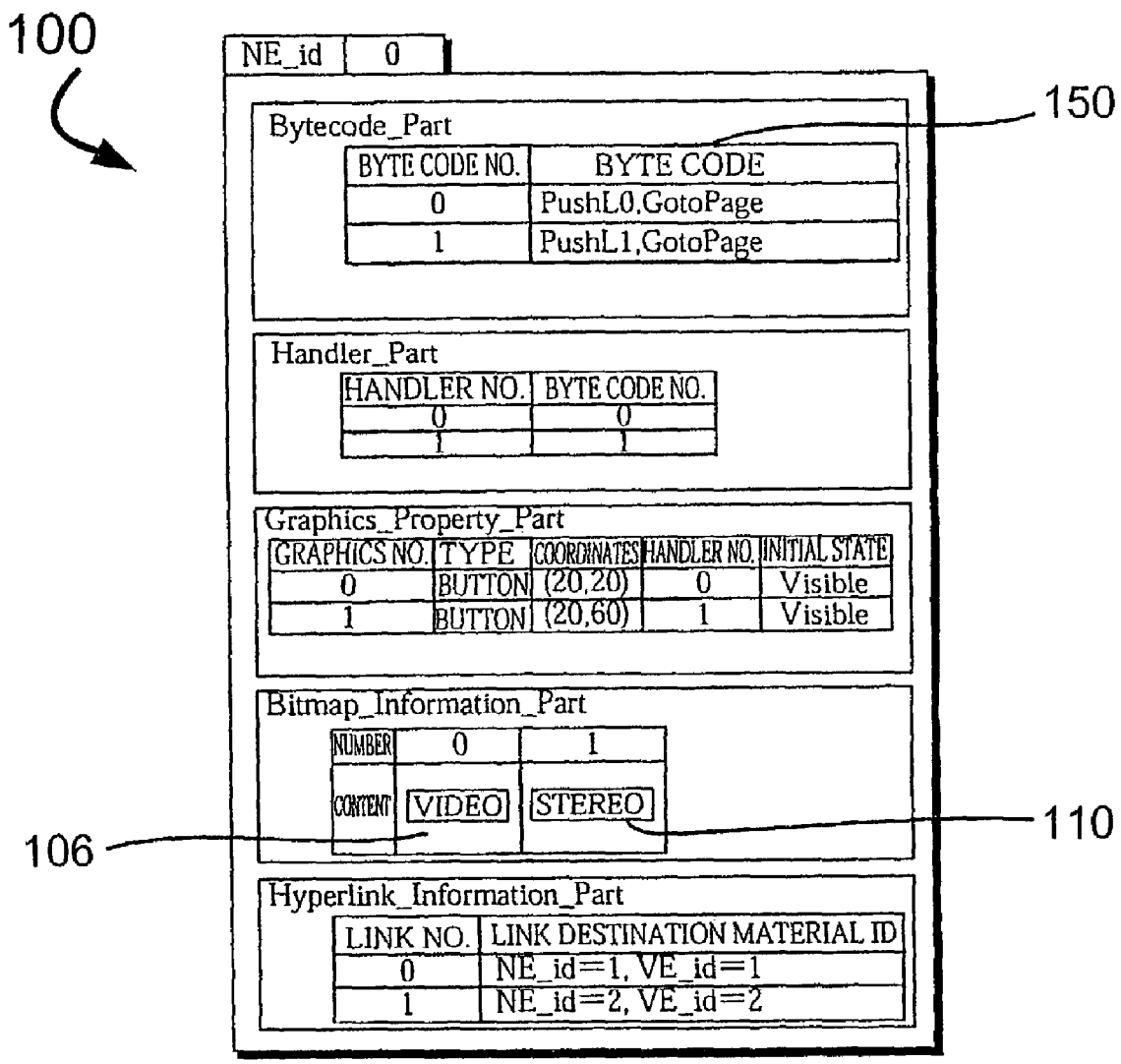
FIG. 1 is a prior art navigation data construction used to drive a program based on user input.
Figure 3:
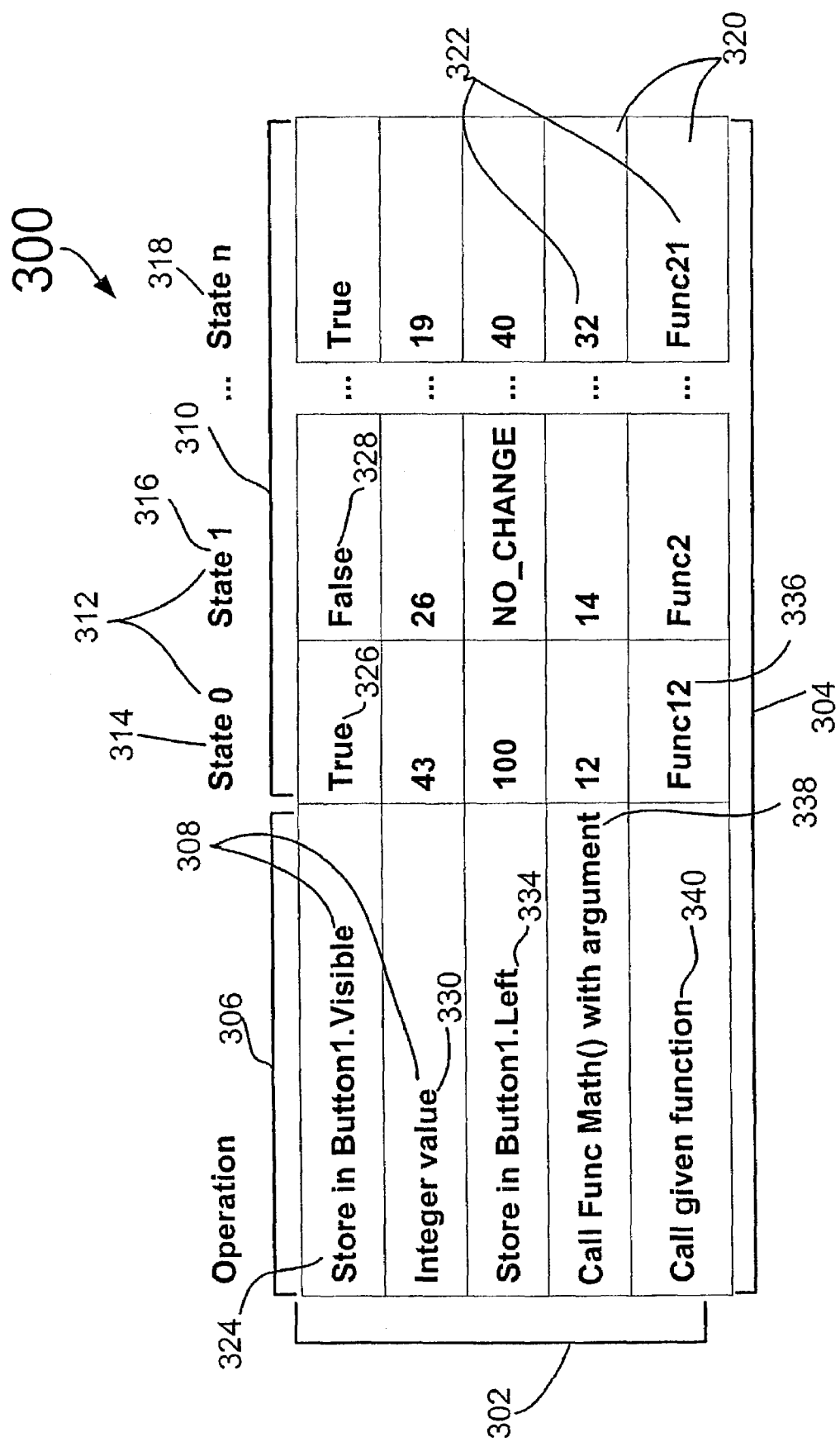
FIG. 3 is a state table according to an embodiment of the present invention.

FIG. 3 shows a state table 300 according to an embodiment of the present invention. The state table 300 has five rows 302 and n+2 columns 304. The first column 306 is a list of operations or programming elements 308. As a result, it will be appreciated that any number of the rows 302 may be used as desired for a particular application as determined by the number of operations or programming elements 308 listed in the first column 306. The remaining columns 310 correspond with each of n+1 states 312 of operation that are contemplated for the behavior of the system using the state table (not shown). It will be appreciated that there are n+1 states because the first state is State 0 314. Thus, if the last state is State n 318, there are a total of n+1 states. There are n+2 columns because there are n+1 states and the additional first column for the list of programming elements.

At intersections of each of the rows 302 and each of the columns 308 after the first column 306 are cells 320 containing operands 322. In each cell 322 is listed an operand for the programming element specified in the first column 306 for that row. Thus, there are n+1 operands 322 specified for each programming element 308 listed in the first column 306 of each row 302, one for each contemplated state, State 0 314 through State n 318. The operands 322 specify an argument needed for the programming element at each of the states 312.

Operation of a system can begin at a non-state (not shown) or with State 0 314. Upon initiating State 0 314 and upon progressing to each state 312, the programming element 308 in each row is executed according to the operand 322 specified in the cell 320 for that programming element 308 at that state 312. In the embodiment shown in FIG. 3, the programming elements each are executed sequentially, from top to bottom, although another order could be selected as desired for a particular application. Depending upon the system being controlled by the state table 300, the states 312 can be stepped through sequentially from State 0 314 through State n 318, or can be randomly accessed. Initiation of state changes suitably results from the passage of time, in response to system or user initiated directives, or based on other changing conditions. The state table 300 thus can be adapted to a variety of applications and contexts.

Given by way of non-limiting example, the first programming element 308 listed in the first row 330 of the first column 306 is "Store in Button1.Visible" 324. For the sake of this non-limiting example, a button represents a displayed icon, having a particular position, size, and appearance, which a user of the system, such as a computer or an interactive media control system, can select to direct the system according to his or her desires. The programming element 308 suitably represents an automatic function call, one of a number of suitable programming element types. The "Store in Button1. Visible" programming element accepts two operands 322: "True" 326, as specified at State 0 314 and "False" 328, as specified at State 1 316. As will be appreciated, while the operands "True" 326 and "False" 328 are spelled out, they could be represented by numerical codes, one-byte symbols, and other forms. In response to the True operand 326 and the False operand 328, the programming element 324 causes Button 1 to become visible at State 0 314, but become invisible at State 1 316, respectively. A transition from State 0 314 to State 1 316 may be indicated by expiration of a set time interval, receipt of a state change signal by the system running the state table, a user initiating a state change by pressing a button or otherwise issuing a command, or in other ways. The data table manifested in the state table 300 thus dictates program behavior in response to state changes.

The state table 300, however, need not execute only one row and thus one programming element at a time. The state table 300 suitably causes to be executed each programming element listed for each operand specified for each state. By way of this non-limiting example, for this state table 300 with five rows 302 of programming elements 308, up to five programming elements are executed for each state change, as will be further described. At State 0 314, the first programming element "Store in Button1.Visible" 324 first is executed with the operand "True" 326. Second, the programming element "Integer Value" 330, a value-setting programming element, sets the value to 43. Third, the programming element "Store in Button1.Left" 334, another automatic function call, sets the left-hand position of Button 1 to 100. Fourth, the "Call Math Func( ) with argument" programming element 338 specifies that function Math( ) is executed with the argument 12. Finally, the "Call given function" programming element 340 initiates the function specified by data element 336 at State 0 314, namely "Func12," which will then be executed. It will be noted that this programming element is a function call that is not an automatic function call as are programming elements 324 and 334. Instead of the programming element 308 specifying the function to be executed, the function to be executed is specified by the operand 336. Using a non-automatic function call advantageously allows for different functions to be executed by the state table for different applications by changing only operands in the state table, without changing the programming elements. As will be described further below, this allows the state table structure to be reused between different applications while changing only the state table data.

Upon the transition to the next state that is State 1 316, the programming elements 308 are executed according to the operand specified for each programming element at this state, with one exception noted in the example. First, "Store in Button1.Visible" 324 is executed with the operand "False" 328, thereby making the button invisible. Second, the programming element "Integer Value" 330 sets the value to 26. This value can be read by program code. Third, the programming element "Store in Button1.Left" 334, this time, is not executed. This is because there is a null operand "NO_CHANGE" specified for the programming element 334 for the current state. When a null operand is specified for a programming element, the programming element is skipped. Therefore, a vast number of programming elements could be specified, even if some of them are seldom used, and the programming elements are merely skipped until transitioning to a state where a non-null operand is specified. Fourth, the "Call Func( ) with argument" programming element 338 calls the function Func( ) with argument 14. Finally, the "Call given function" programming element 340 initiates the function Func2 specified for the programming element 338 at State 1 316.

It will be appreciated that, as the programming elements 308 are executed (or not executed, if a null operand is associated with the programming elements 308 for a current state change), no conditions need to be tested, let alone coded. The desired behaviors are encapsulated in the state table 300 to manifest and control the execution of the system based on the operands coded for each of the programming elements.

It also will be appreciated that transitions between the states can be controlled in a number of ways known to those ordinarily skilled in the art. For example, arguments could be supplied with the operands specifying whether the transition is to be made abruptly, faded in, wiped from one side or the other, or another way. Similarly, the speed of transitions or a duration during which the state change remains in effect could be specified by an argument. Default transition types and durations could be supplied if such arguments are not specified.

For clarity, an extended non-limiting example of the operation of such a state, table-driven system is provided in FIGS. 4A-4F and 5, which depict an example of a cooking show overlaid with information and interaction opportunities for users. In FIG. 4A, a host 400 appears at a countertop 402, as such programs typically begin. In FIG. 4B, the visual component of the show is overlaid by a computer or media control program presenting a recipe 404 for a dish being prepared, listing the ingredients that will be used to prepare the dish. In FIG. 4C, the host 400 is working with a first of the ingredients in a bowl 408, and that first 410 ingredient is highlighted on the recipe 404 displayed to clarify what the host is doing at this point in the program. In a next frame shown at FIG. 4D, the recipe is removed, to remove objects from the display for clarity or for another reason, while a special symbol 412 is appended over the bowl containing the ingredient at issue. The insertion of this special symbol 412 gives the user a chance to purchase the bowl 408 interactively. In FIG. 4E, the special symbol 412 has been removed, the recipe 404 reappears, a second ingredient in a container 414 is being used, and the second ingredient in the recipe 416 is highlighted. This time, again as a choice perhaps for visual clarity as the host 400 works with a second ingredient 414 on a right side of the screen, the recipe 404 is moved to the left side of the screen. Finally, in FIG. 4F, all the graphical objects overlaying the program have been removed.

An embodiment of the present invention allows this graphical information to be transmitted to a device displaying the program. The changes in information can be keyed to triggers in the program, and interactive opportunities similarly can be created. It will be appreciated that these advantages can be accomplished by modifying a state table, such as the state table 500 shown in FIG. 5, without having to use conventional video editing and/or create or edit instruction code.

Referring now to FIG. 5, a state table 500 lists programming elements 502 in a first column 504 at left, and operands 506 relating to each of the programming elements 502 for each of the succeeding states 508 are inserted in cells 510 at intersections of programming element rows and state columns. It will be appreciated that the operands 506 inserted in the state table 500 assume that execution of a system processing the program controlled by the state table commenced operation before execution of the state table began. As is explained in the concurrently-filed patent application entitled "METHOD AND SYSTEM FOR FLEXIBLE TIME-BASED CONTROL OF APPLICATION APPEARANCE AND BEHAVIOR," bearing Ser. No. 10/427,343, and previously incorporated by reference, depending on how the state changes are triggered can affect the nature of the operands used.

At State 0 520, the programming elements 502 for position of a series of buttons are established to present graphics shown in FIGS. 4B-4E. It will be appreciated that objects used to present a recipe, which is not interactive in this example, are suitably the same as a button object that will be used to represent a special symbol. A difference is that the special symbol is set, as will be explained, to respond to user input, while the recipe is not. Having only one object to present such graphical materials, interactive or not, advantageously simplifies code to execute the state table, as will be further explained below. Operands in the column for State 0 520 establish initial left and top positions of the recipe buttons, buttons 1, 2, and 3, 410, 416, and 418 (FIG. 4E), respectively, as well as the special symbol 412, button 4. Subsequent programming elements also set all the buttons to visible=False at State 0 520, because the buttons are not displayed at an initial state, as depicted in FIG. 4A. The colors for text and background are set, and a function call which will later be used for the special symbol/purchase opportunity is set to a NO_CHANGE null-operand. In this case 580, the NO_CHANGE operand signals that no function call is to be made. The parameters are now set for the beginning of the program.

At State 1 530, it will be appreciated that all but three of the operands specified for the programming elements are NO_CHANGE null operands. As a result, advantageously these programming elements can be skipped without processing or conditional programming, and thus dealt with very efficiently. More accurately, these programming elements with null operands are not dealt with at all. Accordingly, while great flexibility for adjusting the parameters controlled by these programming values exists in the state table 500, the application need not process them at each step. Therefore, there is great flexibility without continual complexity.

On the other hand, at State 1 530, the values for the "Store in Button1.Visible," "Store in Button2.Visible," and "Store in Button1.Visible," which represent the recipe are changed from "False" to "True," thereby causing the recipe 404 (FIG. 4B) to be displayed at State 1 530. Again, as previously mentioned, the state change from State 0 520 to State 1 530 could be brought about as desired, such as by a coded signal, expiration of a set time interval, or another form of trigger.

At State 2 540, once again most of the operands for the programming elements are set to NO_CHANGE as the display changes from FIG. 4B to FIG. 4C. It will be appreciated that the only change between FIGS. 4B and 4C is that the first ingredient 410 (FIG. 4C) in the recipe 404 is highlighted by placing the text in reverse-video with regard to the background. This is accomplished once more through the button object by reversing the operands for the "Button1.Text" and "Button1.Color" programming elements at State 2 540. Again, without conditional programming or additional coding, most of the programming elements advantageously can be skipped while the desired behavior is manifested by changing the data associated with the programming elements of interest for the state at issue.

At State 3 550, once more most of the operands are NO_CHANGE. The salient changes in the displayed image of FIG. 4D are that the recipe 404 disappears and the special symbol 412 signifying the purchase opportunity appears, triggering the interactive opportunity for the user. This is all accomplished by changing only five operands. The first four operands change the visibility for each of the four buttons. Specifically, for the visibility programming elements for buttons 1 through 3 the operand is changed to "False," and for the visibility programming element for button 4 the operand is changed to "True." Finally, the "Call given function" programming element 580, a function call programming element, is changed from NO_CHANGE to "Func4," which is a pre-coded function call which will initiate the purchase opportunity.

With regard to the "Call given function" programming element, it will be appreciated that instead of a pre-coded function the actual function code could be inserted here so that such features need not be pre-coded. The cells of the state table can be variable in length, including even programming segments that original programmers wanted to leave open or did not foresee.

At State 4 560, more things change on the display than at any other time, thus more programming elements have non-null operands than for any other state since the initial parameters were set at State 0 520. First, to move the recipe 404 (FIG. 4E) from the right-hand side of the screen to the left-hand side of the screen, the left position of the three recipe buttons is set to a new value. Because the vertical position of the buttons is not changed, the top attribute is still set to NO_CHANGE. Because the recipe 404 now reappears at State 4, the three recipe buttons' visibility attribute is reset to "True." At the same time, because the interactive shopping opportunity ends, the special symbol button 412 disappears with its visibility attribute reset to False. Also, because now, as shown in FIG. 4E, the recipe button 2 416 is highlighted while the recipe button 1 410 is returned to normal video, the text and button color operands are changed. It will be appreciated that this step could have taken place at State 3 550 when the buttons were invisible, if desired. Finally, the "Call given function" programming element is reset to NO-CHANGE, foreclosing the user interaction opportunity.

Finally, at State 5 570, the only change to be manifested is that the recipe 404 once again disappears as shown in FIG. 4F. Accordingly, the visibility attribute operands for each of the three recipe buttons 410, 416, and 418 is set to False. Because nothing else changes, once again the remaining operands are all NO_CHANGE operands which can be skipped by the system.

Figure 6:
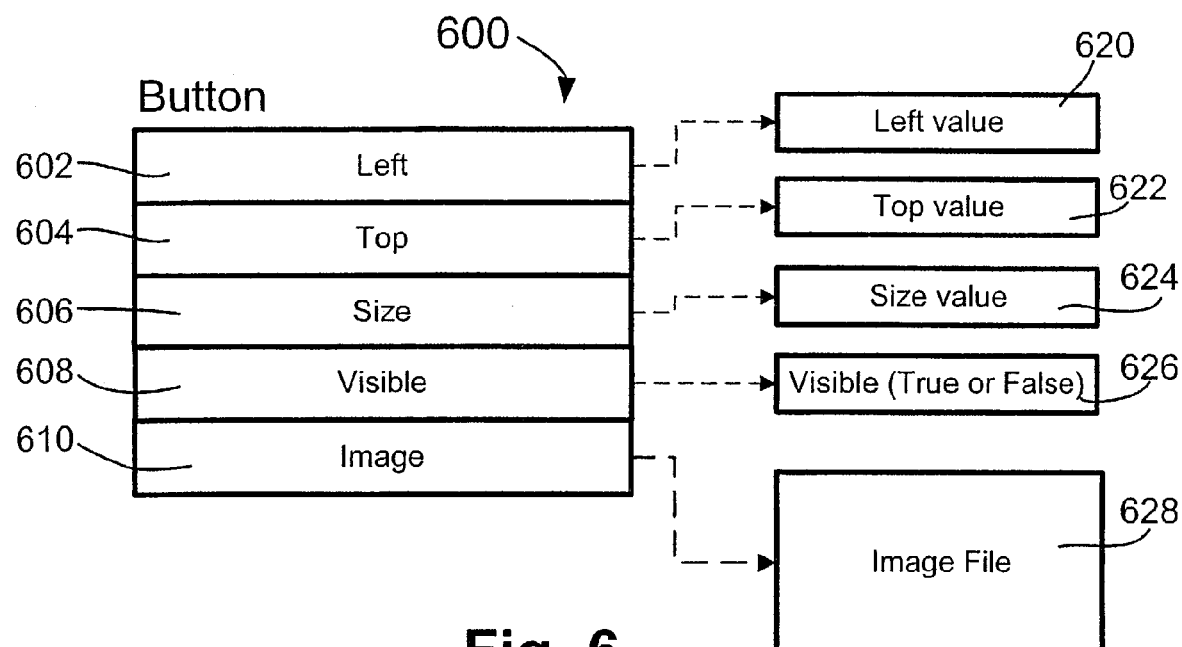
FIG. 6 is a structural map of a graphical user interface button into which new image data can be inserted during run-time according to an embodiment of the present invention.
Figure 7:
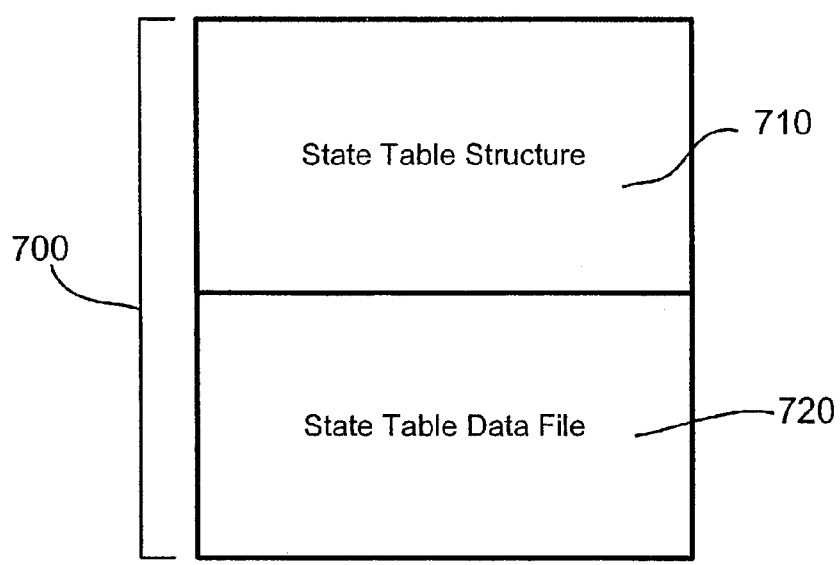
FIG. 7 is a structural map of a state table and state table file according to an embodiment of the present invention.

FIGS. 6 and 7 further illustrate the efficiency of a table-driven system with reference to the button manipulated by the state table 300 of FIG. 3. FIG. 6 shows attributes of a button 600 which, for sake of example, suitably has five properties: left position 602, top position 604, size 606, visibility (yes or no) 608, and image content 610. Presumably, every button of every application which will be created has those same five declarative properties. As previously described in connection with FIG. 3, variables concerning the position or appearance of a button can be dictated by programming element 324 for "Store in Button1.Left." Advantageously, nothing new needs to be coded into application code executing the table to position or format a button. Instead, according to the invention only new data such as values for left position 620, top position 622, size 624, visibility 626, and image content dictated by an image file 628 need be provided. This data is provided as operands in the data table, as previously described. Numeric values for left position, 620, top position 622, size 624, and visibility 626 can be entered into state table fields. In addition, new image appearances in the form of an image file 628, such as, without limitation, icons, can be entered a state table field as well. State table fields can have variable size to accommodate such blocks of graphical data FIG. 7 further shows how efficient data communications result from the state table structure. Referring back to FIG. 3, in the state table 300 the first column 306 lists the programming elements 308, and the remaining columns 310 specify operands for those functions at successive states 312. For example, the application might be a game show with which a user can play along. The underlying game show is a telecast of video and audio data. Overlaying that telecast are suitably buttons which the user can select to choose answers, and a computer or media control system can track the user's score. For a game show repeated nightly or weekly, all the programming elements might be the same in terms of buttons being displayed, answers being scored, etc., from show to show, but the precise values and appearances of those buttons might change. Similarly, a game show with multiple rounds may use the same programming elements for each round, but different operands and a different number of states are needed for different rounds. To specify the user's interaction with the game, including the answers displayed, which answers are correct, how many questions are presented (and therefore states), and other information, behavior of the application can be recast by changing only the operands in the state table.

Therefore, because the programming elements do not change, but only the operands to control the same might be encoded, changing the application advantageously does not require the creation and/or transmission of an entirely new state table. Instead, according to the invention the programming elements 308 (FIG. 3) listed in the first column 306 may remain the same, while only the operands in succeeding columns 310 are changed. Thus, as shown in FIG. 7, a state table 700 can have a separate state table structure 710 which includes the programming elements, and a separate state table file 720, which contains operands for tailoring the function of the application. Dividing the state table 700 into different components yields smaller blocks of data to be transmitted at one time. Moreover, a reusable state table structure 710, which could be reused from week-to-week, day-to-day, or at least round-to-round would not have to be retransmitted each time. Instead, only a new data table file 720 would have to be retransmitted, thereby saving data transmission bandwidth.

FIGS. 8A and 8B show benefits of a state-table driven system 800 in contrast to those of a conventional system 200 depicted in FIGS. 2A and 2B. Some elements shown in FIGS. 8A and 8B are the same as those shown in FIGS. 2A and 2B; these elements bear the same reference numerals, and a description of the operation of these common elements will not be repeated.

In the state-table driven system 800 shown in FIG. 8A, the application 801 includes two parts. First, a general application code module 802 resides above the operating system/middleware 208. The general application code module 802 includes support for processing functions that may be initiated by programming elements in the state table 804, as well the functions referenced by the programming elements and operands in the state table. This is a reusable module whose functionality will actually be driven by data encoded in the state table 804, as previously described in connection with FIG. 4. The general application code module is responsible for executing the behaviors encoded in the state table 804. Second, the state table 804, a data construct, directs operation of the general application code 802, creating a data-driven system.

As will be appreciated from FIG. 8A, the state table 804 is not as large as the general application code module 802. Consequently, to modify the application run by the general application code module 802 and the state table 804, instead of modifying the entire application 202 (FIG. 2A) as required by conventional systems, only the state table 804 has to be modified. Moreover, because the general application code module 804 provides support for processing a state table 804 and executing general functions that may be initiated by a state table 804, entire new applications can be created by creating a new state table 804 without having to write or debug new code, or load or otherwise communicate new code to the system 800 running the application. Moreover, as previously described in connection with FIG. 7, application behavior can be changed merely by loading or transmitting a new state table file (not shown) without sending an entire new state table, further reducing bandwidth requirements.

Bandwidth benefits of using the state table driven system 800 can be seen by examining the contrast between FIGS. 2B and 8B. FIG. 2B shows a conventional system as previously described in which the loading of a new, revised, or updated application requires the bandwidth and the loading time to load an entirely new application. By contrast, FIG. 8B shows that, in a state table driven system 800 (FIG. 8A), revised, updated or entirely new applications can be made available by communicating only a new state table 804. Assuming equal bandwidth across a data bus or a network communications link, communicating new state tables 804 requires far less bandwidth to change current applications or distribute new applications.

Figure 9:
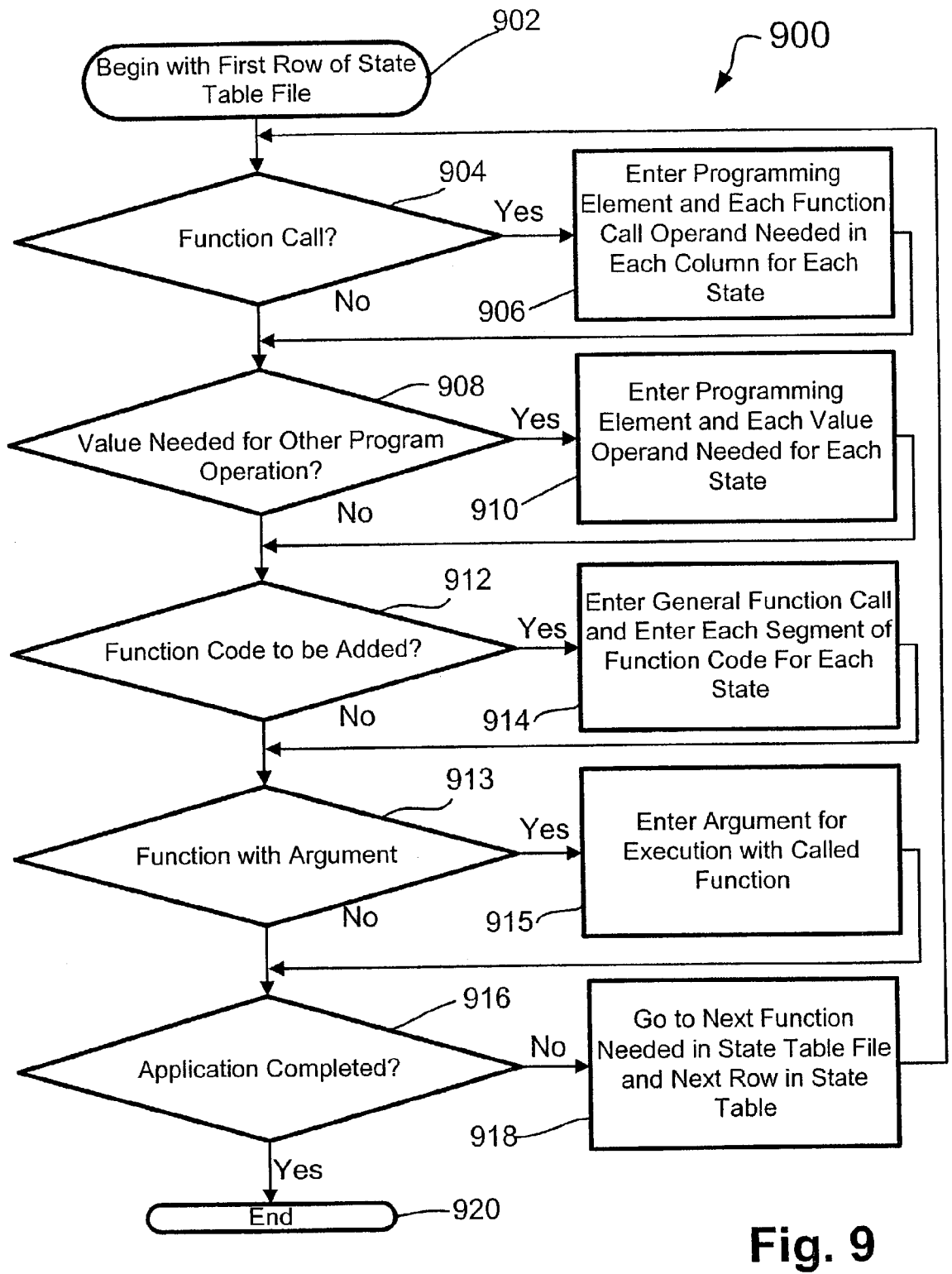
FIG. 9 is a flowchart of the steps used to create a state table according to an embodiment of the present invention.
Figure 10:
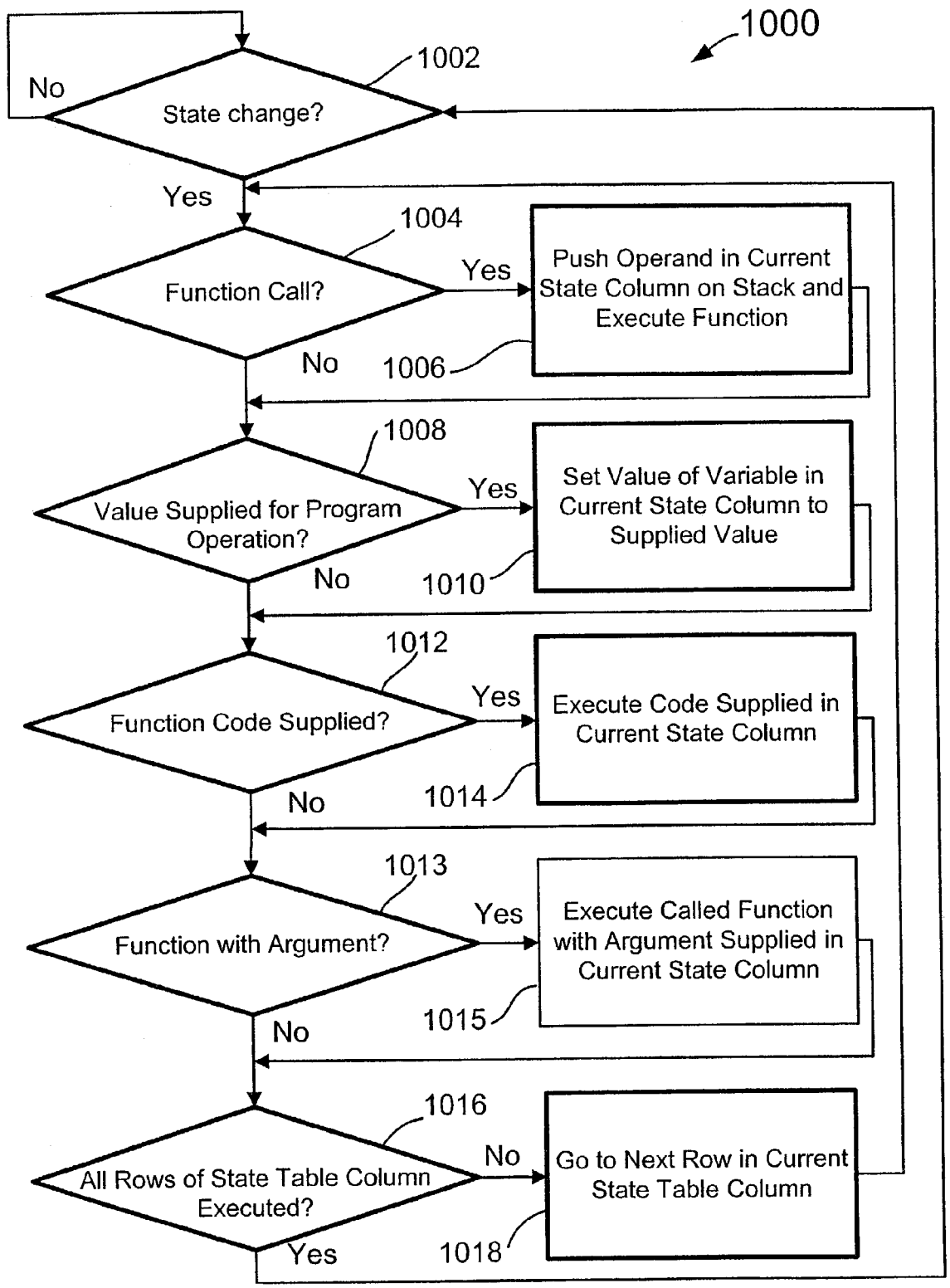
FIG. 10 is a flowchart of the steps used in executing a state table according to an embodiment of the present invention.

FIGS. 9 and 10 depict in flowchart form methods of preparing and executing state tables. FIG. 9, specifically, depicts a method 900 for creating a state table. Beginning with a first row of the state table at a block 902, the method 900 iteratively determines what programming element is to be used. At a decision block 904, it is determined if the programming element is a function call. If so, for each state, the operand for the function call, whether an automatic function call or an ordinary function call, is provided at a block 906. Alternatively, if it is determined that a value setting programming element is invoked at a decision block 908, at a block 910 each state column is filled in with the value appropriate to the value setting programming element at each state. As a further alternative, if it is determined that a non-precoded function code segment is entailed at a decision block 912, the function code segment for each state is provided in the appropriate column at a block 914. As a still further alternative, it is determined at a decision block 913 that a function call with argument is needed, at a block 915 the function is entered as the programming element and the arguments needed are entered in the appropriate state table column. If it is determined at a decision block 916 that not all of the desired functions have been captured in the state table, the next function is encapsulated moving to the next row in the table at a block 918. Alternatively, once it is determined at the block 916 that all the behaviors have been encapsulated in the table, the table is complete and the method ends at a block 920.

FIG. 10 depicts a method 1000 for execution of a state table. If it is determined at a decision block 1002 that a state change has occurred, at a decision block 1004 it is determined if the programming element is a function call and, if so, at a block 1006 the operand designating the function call is pushed onto an execution stack, and the function is executed appropriately. Alternatively, if the programming element is determined at a decision block 1008 to be a value setting programming element, the value is set to the value supplied in the current state column at a block 1010. Also alternatively, if it is determined at a decision block 1012 that the current entry in the state table column is a function code, that code is executed at a block 1014. As a still further alternative, if it is determined at a decision block 1013 that a function call with argument has been made, at a block 1015 the function is executed with the argument listed in the current state table column. If it is determined at a decision block 1016 that not all the rows of the state table for the current state have been executed, at a block 1018 the system goes to the next row of the state table in the current state column and executes that programming element at a block 1018. On the other hand, once it is determined at the decision block 1016 that all the rows for the current state have been executed, the system waits for the next state change at the block 1002. It will be appreciated that if a null operand is encountered, that operand does not trigger any of the operations at blocks 1006, 1010, or 1014, and the method simply passes to the next row in the state table or, if the null operand is the last row, the system waits for the next state change at a decision block 1002.

Figure 11:
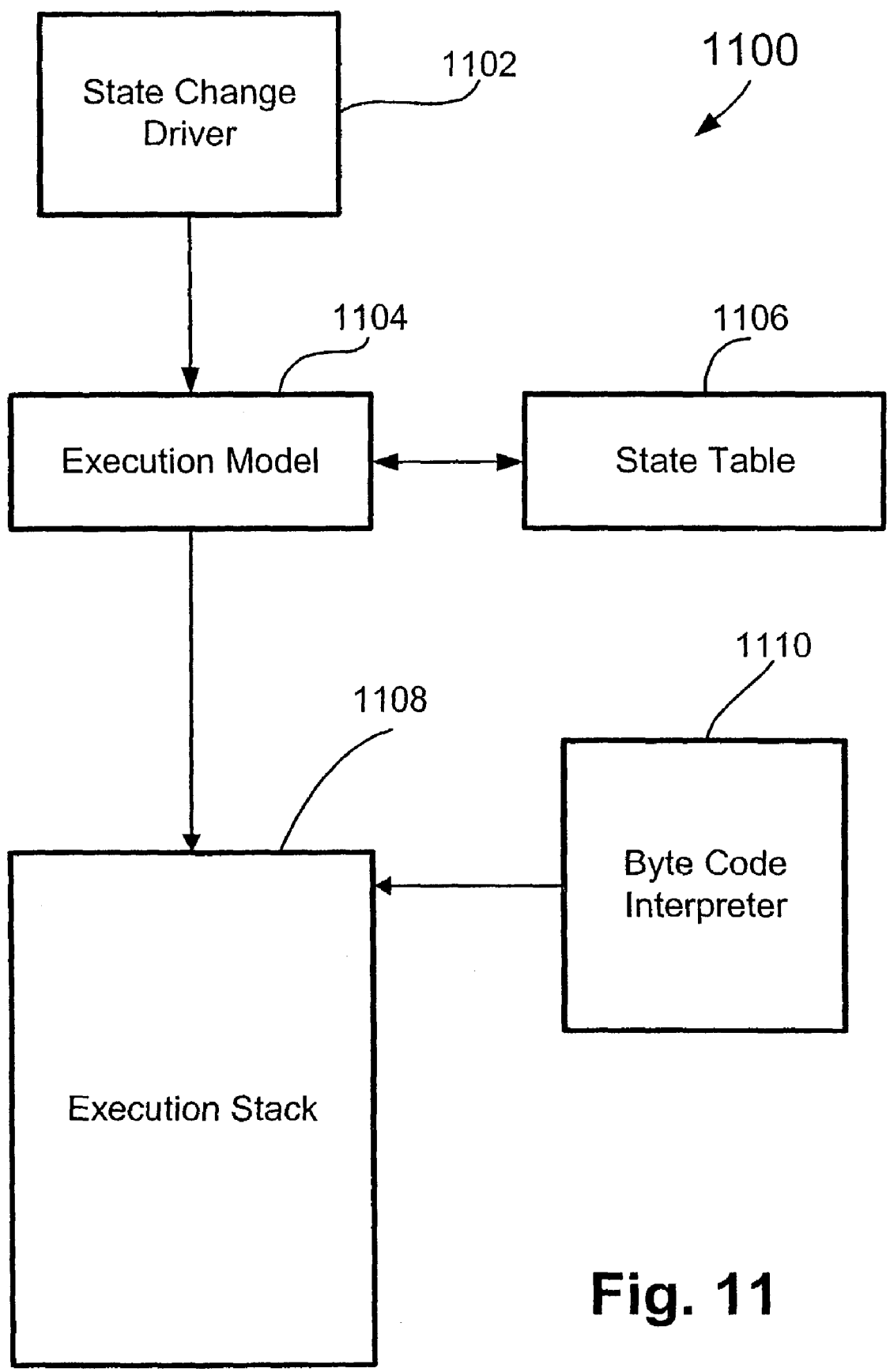
FIG. 11 is a block diagram of a system using an embodiment of the present invention; and, FIG. 12 is a block diagram of a data processing/media control system using an embodiment of the present invention.

FIG. 11 shows a block diagram of a system 1100 for executing an application using a state table according to an embodiment of the present invention. The system 1100 is keyed by a state change driver 1102. As previously described, the state change driver can be a timer, a signal receiver for acting on a manual signal, or another device that initiates a transition to a next state. More specifically, the state change driver 1102 keys an execution model 1104 which engages the state table 1106. The execution model 1104, in accordance with the method described in connection with FIG. 10 above, evaluates each programming element and associated operand for the current state. Appropriate to the programming elements and operand combinations encountered, the execution model pushes onto an execution stack 1108 data and function code to be executed according to the programming elements. A byte code interpreter 1110 takes the entries from the execution stack and processes the programming elements. It will be appreciated that changing the state table 1106 advantageously controls application behavior without having to change the state change driver 1102, the execution model 1104, the execution stack 1108, or the byte code interpreter 1110.

Figure 12:
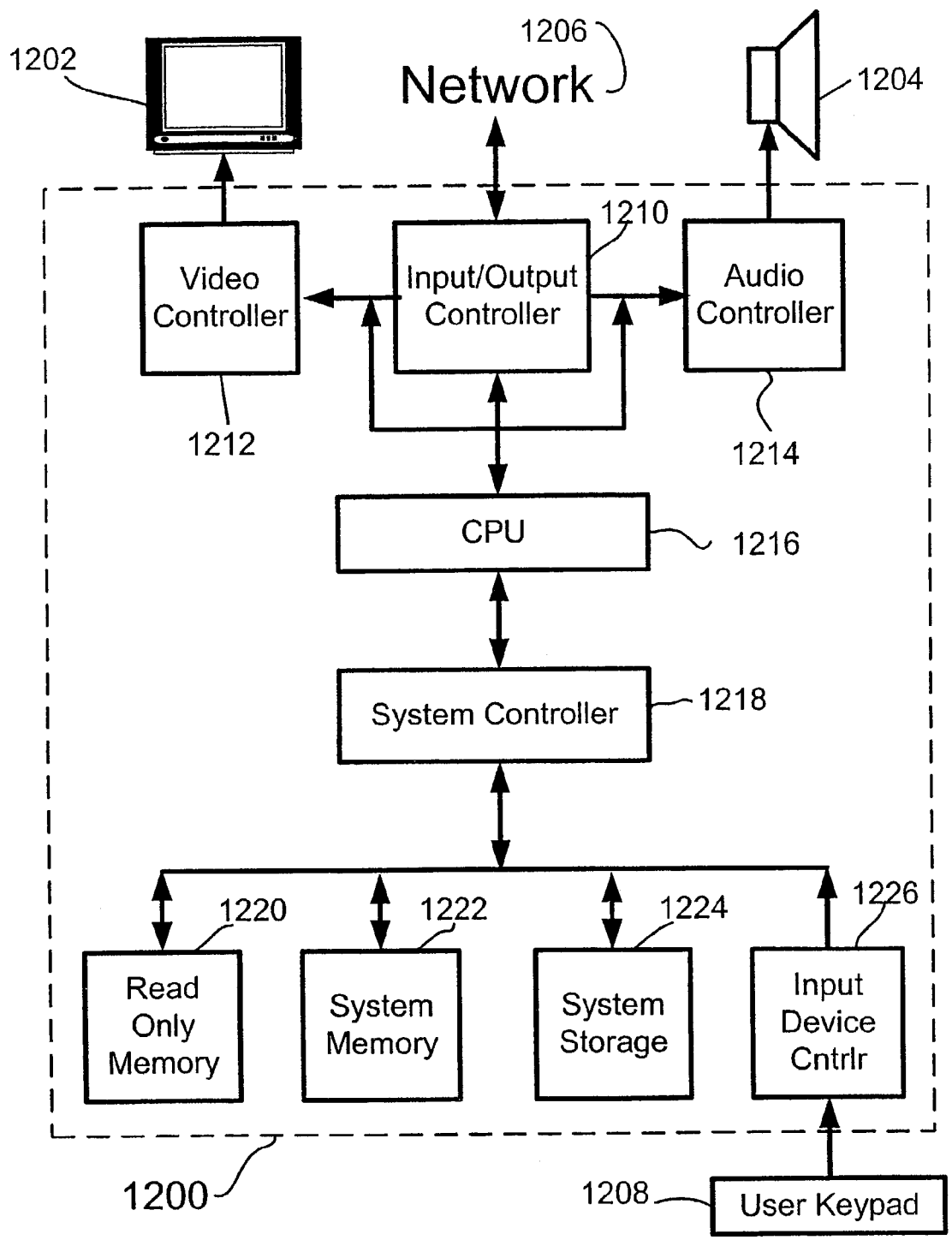

FIG. 12 shows a computer system 1200, which could be in the form of a media controller or a set-top box (STB) operable for using embodiments of the present invention. The computer system 1200 is operable for controlling a display 1202, such as a television, and an audio subsystem 1204, such as a stereo or a loudspeaker system. The computer system 1200 receives input from a network 1206, such as a broadband data network. The computer system 1200 also receives user input from a wired or wireless user keypad 1208, which may be in the nature of a STB remote.

The computer system 1200 receives input from the network 1206 via an input/output controller 1210, which directs signals to and from a video controller 1212, an audio controller 1214, and a central processing unit (CPU) 1216. In the case of a STB, the input/output controller 1210 suitably is a multiplexer for routing video data blocks received from the network 1206 to a video controller 1212 in the nature of a video decoder, audio data blocks to an audio controller 1214 in the nature of an audio decoder, and for routing other data blocks to a CPU 1216 for processing. In turn, the CPU 1216 communicates through a system controller 1218 with input and storage devices such as read only memory (ROM) 1220, system memory 1222, system storage 1224, and input device controller 1226.

The computer system 1200 shown in FIG. 12 thus can receive state tables or state table files, pass them through the input/output controller 1210 to the CPU 1216 where it will be processed through the system controller 1218, suitably in response to user input gathered through the user keypad 1208 and the input device controller 1226. The state table can then be executed as previously described in connection with the foregoing examples, method flowcharts, and block diagrams.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for controlling computer system operation in response to state changes in the computer system, the method comprising:

creating at least one state table having a first dimension and a second dimension, at least one programming element being listed along the first dimension and a plurality of states of the computer system being listed along the second dimension;

storing an operand in a cell at each intersection of the first dimension and the second dimension, the operand further being specified for the programming element at each state, wherein the operand is selected from a list comprising at least one null value; and processing each programming element listed along the first dimension according to the operand listed for a current state for each state change of the computer system, wherein if the operand is the at least one null value, the programming element is not performed.

2. The method of claim 1, further placing a non-null operand onto an execution stack from which the non-null operand can be processed according to the programming element associated with the cell.

3. The method of claim 2, further retrieving the non-null operand from the execution stack and processing the operand according to the programming element associated with the cell.

4. The method of claim 3, wherein the non-null operand includes a byte-code, the byte-code representing a predetermined action to a byte-code interpreter being executed by the programming element.

5. The method of claim 1, wherein the programming element includes a function call.

6. The method of claim 5, wherein the function call includes an automatic function call.

7. The method of claim 6, wherein the operand includes data used by the automatic function call, such that when the automatic function call is initiated by a state change of the computer system, the programming element performs its programmed function using the data specified as the operand.

8. The method of claim 5, wherein the operand includes a function specifier, the function specifier indicating what function should be executed by the function call programming element.

9. The method of claim 1, wherein the programming element includes a value setting function, wherein the operand includes a value to which a variable named in the programming element is set.

10. The method of claim 1, wherein the programming element includes a code segment specifier and the operand includes a code segment to be executed.

11. The method of claim 1, wherein the operands in the cells at each intersection of the first dimension and the second dimension of the state table are of a fixed length.

12. The method of claim 1, wherein the operands in the cells at each intersection of the first dimension and the second dimension of the state table are of a variable length.

13. The method of claim 1, wherein the state table includes a state table structure and a state table data file, such that the state table data file contains the operands stored in the cells at the intersections of the first and second dimensions and the values of the operands can be changed by specifying a new state table data file to be used in the state table structure without having to load a new state table structure.

14. The method of claim 1, wherein the state changes are triggered by one of preprogramming, user input, or an external event.

15. The method of claim 1, wherein the execution of programming elements in response to state changes of the computer system is implemented according to a default transition or according to a specified transition.

16. The method of claim 15, wherein the default transition is an instantaneous transition.

17. The method of claim 15, wherein the specified transition to be applied in response to the state changes is specified by transition parameters included in the cells at intersections of the first dimension and the second dimension of the state table.

18. The method of claim 17, wherein the transition parameters include at least one of a final state, a transition type, and a transition duration.

19. A method for controlling computer system operation in response to state changes in the computer system, the method comprising:

creating a reusable execution model for executing a plurality of programming elements responsive to an operand specified for executing each programming element during a current state of the computer system such that the reusable execution model does not need to be modified when a programming element or an operand is changed, wherein the operand is selected from a list comprising at least one null value; and creating at least one run-specific state table having a first dimension and a second dimension, at least one programming element being listed along the first dimension and a plurality of states of the computer system being listed along the second dimension, the operand in each cell at each intersection of the first dimension and the second dimension being specified for the programming element at each state of the computer system for the current operation of the computer system, wherein if the operand in the cell is the at least one null value, the corresponding program element is not performed.

20. The method of claim 19, further comprising processing the state table such that as a non-null operand is presented in a cell, the execution model places the non-null operand onto an execution stack from which the non-null operand can be processed according to the programming element associated with the cell.

21. The method of claim 20, further comprising retrieving the non-null operand from the execution stack and processing the operand according to the programming element associated with the cell.

22. The method of claim 21, wherein the non-null operand includes a byte-code, the byte-code representing a predetermined action to a byte-code interpreter and being executed by the programming element.

23. The method of claim 19, wherein the programming element includes a function call.

24. The method of claim 23, wherein the function call includes an automatic function call.

25. The method of claim 24, wherein the operand includes data used by the automatic function call, such that when the automatic function call is initiated by a state change of the computer system, the programming element performs its programmed function using the data specified as the operand.

26. The method of claim 25, wherein the operand includes a function specifier, the function specifier indicating what function should be executed by the function call programming element.

27. The method of claim 19, wherein the programming element includes a value setting function, wherein the operand includes a value to which a variable named in the programming element is set.

28. The method of claim 19, wherein the programming element includes a code segment specifier, wherein the operand includes a code segment to be executed.

29. The method of claim 19, wherein the cells at each intersection of the first dimension and the second dimension are of a fixed length.

30. The method of claim 19, wherein the cells at each intersection of the first dimension and the second dimension are of a variable length.

31. The method of claim 19, wherein the state table comprises a state table structure and a state table file, such that the state table file contains the operands stored in the cells at the intersections of the first and second dimensions and the values of the operands can be changed by specifying a new state table file to be used in the state table structure without having to load a new state table structure.

32. The method of claim 19, wherein the state changes are triggered by one of preprogramming, user input, or an external event.

33. The method of claim 19, wherein the execution of programming elements in response to state changes of the computer system is implemented according to a default transition or according to a specified transition.

34. The method of claim 33, wherein the default transition is an instantaneous transition.

35. The method of claim 33, wherein the specified transition to be applied in response to the state changes is specified by transition parameters included in the cells at intersections of the first dimension and the second dimension of the state table.

36. The method of claim 35, wherein the transition parameters include at least one of a final state, a transition type, and a transition duration.

37. A computer readable medium having stored thereon instructions for controlling operations of a computer in responses to state changes, the computer readable medium comprising:

first computer program code means for creating at least one state table having a first dimension and a second dimension, at least one programming element being listed along the first dimension and a plurality of states of the computer operations being listed along the second dimension;

an operand being stored in a cell at each intersection of the first dimension and the second dimension, the operand being specified for the programming element at each state, wherein the operand is selected from a list comprising at least one null value; and second computer program means for processing each programming element listed along the first dimension according to the operand listed in the cell for a current state for each state change of the computer system, wherein if the operand in the cell is the at least one null value, the corresponding program element is not performed.

38. The computer readable medium of claim 37, further comprising third computer code means for creating an execution model placing a non-null operand onto an execution stack from which the non-null operand can be processed according to the programming element associated with the cell.

39. The computer readable medium of claim 38, further comprising fourth computer code means for retrieving the non-null operand from the execution stack and processing the operand according to the programming element associated with the cell.

40. The computer readable medium of claim 39, wherein the non-null operand includes a byte-code, the byte-code representing a predetermined action to the byte-code interpreter to be executed by the programming element.

41. The computer readable medium of claim 37, wherein the programming element includes a function call.

42. The computer readable medium of claim 41, wherein the function call includes an automatic function call.

43. The computer readable medium of claim 42, wherein the operand includes data used by the automatic function call, such that when the automatic function call is initiated by a state change of the computer operations, the programming element performs its programmed function using the data specified as the operand.

44. The computer readable medium of claim 43, wherein the operand includes a function specifier, the function specifier indicating what function should be executed by the function call programming element.

45. The computer readable medium of claim 37, wherein the programming element includes a value setting function, wherein the operand includes a value to which a variable named in the programming element is set.

46. The computer readable medium of claim 37, wherein the programming element includes a code segment specifier, wherein the operand includes a code segment to be executed.

47. The computer readable medium of claim 37, wherein the cells at each intersection of the first dimension and the second dimension are of a fixed length.

48. The computer readable medium of claim 37, wherein the cells at each intersection of the first dimension and the second dimension are of a variable length.

49. The computer readable medium of claim 37, wherein the state table includes a state table structure and a state table data file, such that the state table data file contains the operands stored in the cells at the intersections of the first and second dimensions and the values of the operands can be changed by specifying a new state table data file to be used in the state table structure without having to load a new state table structure.

50. The computer readable medium of claim 37, wherein the state changes are triggered by one of preprogramming, user input, or an external event.

51. The computer readable medium of claim 37, wherein the execution of programming elements in response to state changes of the computer system is implemented according to a default transition or according to a specified transition.

52. The computer readable medium of claim 51, wherein the default transition is an instantaneous transition.

53. The computer readable medium of claim 51, wherein the specified transition to be applied in response to the state changes is specified by transition parameters included in the cells at intersections of the first dimension and the second dimension of the state table.

54. The computer readable medium of claim 53, wherein the transition parameters include at least one of a final state, a transition type, and a transition duration.

55. A data system for controlling operation of a computer system in response to state changes in the computer system, the system comprising:
at least one state table having a first dimension and a second dimension, at least one programming element being listed along the first dimension and a plurality of states of the computer system being listed along the second dimension;
an operand being stored in a cell at each intersection of the first dimension and the second dimension, the operand being specified for the programming element at each state, wherein the operand is selected from a list comprising at least one null value; and
an operand processor processing each programming element listed along the first dimension according to the operand listed in the cell for a current state for each state change, wherein if the operand in the cell is the at least one null value, the corresponding program element is not performed.

56. The system of claim 55, further comprising an execution model for placing a non-null operand onto an execution stack from which the non-null operand can be processed according to the programming element associated with the cell.

57. The system of claim 56, further comprising a byte-code interpreter for retrieving the non-null operand from the execution stack and processing the operand according to the programming element associated with the cell.

58. The system of claim 57, wherein the non-null operand includes a byte-code, the byte-code representing a predetermined action to the byte-code interpreter to be executed by the programming element.

59. The system of claim 55, wherein the programming element is a function call.

60. The system of claim 59, wherein the function call includes an automatic function call.

61. The system of claim 60, wherein the operand includes data used by the automatic function call, such that when the automatic function call is initiated by a state change of the computer system, the programming element performs is programmed function using the data specified as the operand.

62. The system of claim 61, wherein the operand includes a function specifier, the function specifier indicating what function should be executed by the function call programming element.

63. The system of claim 55, wherein the programming element includes a value setting function, wherein the operand includes a value to which a variable named in the programming element is set.

64. The system of claim 55, wherein the programming element includes a code segment specifier, wherein the operand includes a code segment to be executed.

65. The system of claim 55, wherein the cells at each intersection of the first dimension and the second dimension are of a fixed length.

66. The system of claim 55, wherein the cells at each intersection of the first dimension and the second dimension are of a variable length.

67. The system of claim 55, wherein the state table includes a state table structure and a state table data file, such that the state table data file contains the operands stored in the cells at the intersections of the first and second dimensions and the values of the operands can be changed by specifying a new state table data file to be used in the state table structure without having to load a new state table structure.

68. The system of claim 55, wherein the state changes are triggered by one of preprogramming, user input, or an external event.

69. The system of claim 55, wherein the execution of programming elements in response to state changes of the computer system is implemented according to a default transition or according to a specified transition.

70. The system of claim 69, wherein the default transition is an instantaneous transition.

71. The system of claim 69, wherein the specified transition to be applied in response to the state changes is specified by transition parameters included in the cells at intersections of the first dimension and the second dimension of the state table.

72. The system of claim 71, wherein the transition parameters include at least one of a final state, a transition type, and a transition duration.

73. An interactive media control system for controlling operation of a media program in response to state changes in the interactive media control system, the interactive media control system comprising:
    at least one state table having a first dimension and a second dimension, at least one programming element being listed along the first dimension and a plurality of states of the interactive media control system being listed along the second dimension;
    an operand being stored in a cell at each intersection of the first dimension and the second dimension, the operand being specified for the programming element at each state, wherein the operand is selected from a list comprising at least one null value; and
    an operand processor configured to process each programming element listed along the first dimension according to the operand listed in the cell for a current state for each state change, wherein if the operand in the cell is the at least one null value, the corresponding program element is not performed.

74. The interactive media control system of claim 73, further comprising an execution model for placing a non-null operand onto an execution stack from which the non-null operand can be processed according to the programming element associated with the cell.

75. The interactive media control system of claim 74, further comprising a byte-code interpreter for retrieving the non-null operand from the execution stack and processing the operand according to the programming element associated with the cell.

76. The interactive media control system of claim 75, wherein the non-null operand includes a byte-code, the byte-code representing a predetermined action to the byte-code interpreter to be executed by the programming element.

77. The interactive media control system of claim 75, wherein the programming element is a function call.

78. The interactive media control system of claim 77, wherein the function call includes an automatic function call.

79. The interactive media control system of claim 78, wherein the operand includes data used by the automatic function call, such that when the automatic function call is initiated by a state change of the interactive media control system, the programming element performs its programmed function using the data specified as the operand.

80. The interactive media control system of claim 79, wherein the operand includes a function specifier, the function specifier indicating what function should be executed by the function call programming element.

81. The interactive media control system of claim 73, wherein the programming element includes a value setting function, wherein the operand includes a value to which a variable named in the programming element is set.

82. The interactive media control system of claim 73, wherein the programming element includes a code segment specifier, wherein the operand includes a code segment to be executed.

83. The interactive media control system of claim 73, wherein the cells at each intersection of the first dimension and the second dimension are of a fixed length.

84. The interactive media control system of claim 73, wherein the cells at each intersection of the first dimension and the second dimension are of a variable length.

85. The interactive media control system of claim 73, wherein the state table includes a state table structure and a state table file, such that the state table file contains the operands stored in the cells at the intersections of the first and second dimensions and the values of the operands can be changed by specifying a new state table file to be used in the state table structure without having to load a new state table structure.

86. The interactive media control system of claim 73, wherein the state changes are triggered by one of preprogramming, user input, or an external event.

87. The interactive media control system of claim 73, wherein the execution of programming elements in response to state changes of the interactive media control system is implemented according to a default transition or according to a specified transition.

88. The interactive media control system of claim 87, wherein the default transition is an instantaneous transition.

89. The interactive media control system of claim 87, wherein the specified transition to be applied in response to the state changes is specified by transition parameters included in the cells at intersections of the first dimension and the second dimension of the state table.

90. The interactive media control system of claim 89, wherein the transition parameters include at least one of a final state, a transition type, and a transition duration.

* * * * *